Nov. 10, 1936.  R. C. PALICKI  2,060,342
METHOD OF MAKING COATED FABRIC ARTICLES
Filed April 4, 1935
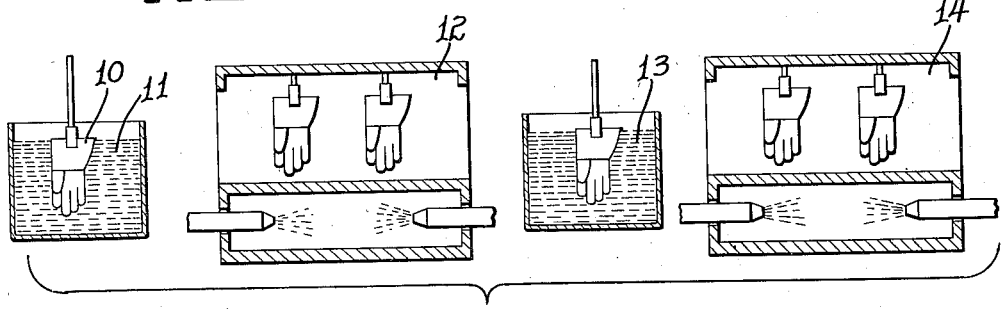
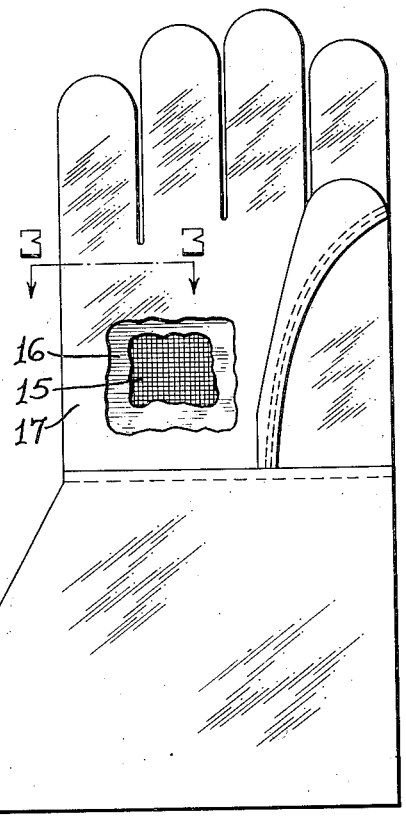
Inventor
Robert C. Palicki
By Owen & Owen
Attorneys Patented Nov. 10, 1936

2,060,342

UNITED STATES PATENT OFFICE 2,060,342

METHOD OF MAKING COATED FABRIC ARTICLES

Robert C. Palicki, Toledo, Ohio

Application April 4, 1935, Serial No. 14,670

1 Claim. (Cl. 91—68)

This invention relates to coated fabrics and method of making the same, but more particularly to work gloves or gauntlets, and to the manufacture thereof, and an object is to produce a coated fabric and a method of making the same, which is simple and inexpensive to carry out, and the finished product is not only waterproof, wear-resistant and free from stickiness, but is also capable of withstanding certain rubber solvents.

Another object is to produce new and improved work glove, which is rubber coated, capable of withstanding certain rubber solvents and is of such character that it can be produced inexpensively in a simple and convenient manner.

Other objects and advantages will hereinafter appear, and, for purposes of illustration, but not of limitation, an embodiment of the invention is shown on the accompanying drawing, in which:

Figure 1 is a diagrammatic view showing a method of producing rubber coated work gloves in accordance with this invention;

Figure 2 is a plan view of a coated work glove, a portion being cut away to show the coatings therefor; and Figure 3 is an enlarged sectional view on the line 3—3 of Figure 2.

Referring to the drawing, a glove or gauntlet 10 of flexible porous fabric, such as canton flannel, or partly of canton flannel and partly of leather, or entirely of leather, is first provided, the article first being preformed with the several parts sewed together in the usual manner. This glove is then coated, as by dipping in a solution 11, which preferably consists of 60% pure rubber sap, 5% ammonia and 35% distilled water. The use of pure rubber sap is particularly advantageous because it readily adheres to the glove material; it is tough and quite resilient, and lends itself conveniently to application. Where dipping is desired the glove is immersed in order completely to cover the outer surface thereof and to soak into the material as well as to the several seams. It has been found that immersion of approximately one minute is satisfactory for the purpose.

Thereafter the rubber coating is dried in a heated chamber 12 sufficiently so that the water is evaporated and the dried rubber coating remains. Although the time within which drying may be accomplished will vary in accordance with the temperature within the chamber, it has been found that satisfactory results are obtained where the chamber is heated to approximately 150° F., the drying time being approximately one-half hour.

It will readily be understood that gloves coated in this manner will not be entirely satisfactory because the rubber is somewhat tacky, and also because the coating would be injured by rubber solvents, such as gasoline, and certain acids. This would militate against satisfactory use of the glove around places, such as gasoline stations, chemical factories, tanneries; in fact any place where materials injurious to rubber are being handled. To obviate this difficulty the rubber coated glove is, in accordance with this invention, coated with a solution of shellac, lacquer, or the like. As shown, the glove or gauntlet is dipped in a solution 13, which may consist of 94% wood alcohol and 6% shellac. This is found to be sufficient and entirely satisfactory to cover the rubber layer with a thin protective coating, which is not only a preservative and protects the rubber against rubber-solvents, but also eliminates the tackiness and provides an attractive sheen or glossy outer surface. The shellac may be colored, if desired, to present any desired attractive coloring to the outer surface of the glove.

After the glove is removed from the solution 13, it is introduced into a drying chamber 14 under a temperature of 150° F. The shellac coating will dry in approximately five minutes.

Figures 2 and 3 show the glove in coated condition, the layer 15 being the flexible fabric glove, as above described, 16 the pure sap rubber coating, and 17 the outer protective resinous coating. A glove or gauntlet so coated has been found exceptionally satisfactory in service. Not only do the coatings prolong the life of the glove by rendering it more wear-resistant, but provide an exceedingly flexible glove which is water-resistant, and is also resistant to many materials which normally detrimentally affect the rubber. By experiment it has been found that the outer coating 17 affords good protection against many acids, some of which are hydrochloric, phosphoric, and sulphuric, and copper cyanide, as well as many other salt solutions.

It is to be understood that this invention is not limited to work gloves, but can also be used to advantage in connection with other articles where a rubber coating having applied thereto an outer coating of preservative or protective material, is desired, so it is to be understood that numerous changes in details of construction and choice of materials may be effected without departing from the spirit of the invention, especially as defined in the appended claim.

What I claim as new and desire to secure by Letters Patent is:

In the manufacture of work gloves the method of coating a textile fabric which consists in applying to the fabric a solution consisting of 60% pure rubber sap, 5% ammonia, 35% distilled water, drying the solution, and then applying to the tacky coating a solution consisting of 94% wood alcohol and 6% shellac.

ROBERT C. PALICKI.